United States Patent
Pande et al.

(10) Patent No.: US 8,098,929 B2
(45) Date of Patent: Jan. 17, 2012

(54) METHOD AND SYSTEM FOR AUTOMATIC CORRECTION OF FLESH-TONES (SKIN-TONES)

(75) Inventors: Anand Pande, Bangalore (IN); Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 951 days.

(21) Appl. No.: 12/038,965

(22) Filed: Feb. 28, 2008

(65) Prior Publication Data

US 2009/0220150 A1    Sep. 3, 2009

(51) Int. Cl.
*G06K 9/00* (2006.01)
(52) U.S. Cl. ........................................................ 382/162
(58) Field of Classification Search .................. 382/100, 382/103, 115, 118, 232–233, 254, 274, 282, 382/286; 348/143, 152, 161, 169, 222.1, 348/362, 364
See application file for complete search history.

(56) References Cited

U.S. PATENT DOCUMENTS

| | | | | |
|---|---|---|---|---|
| 7,440,593 B1 * | 10/2008 | Steinberg et al. | ............. | 382/118 |
| 7,574,016 B2 * | 8/2009 | Steinberg et al. | ............. | 382/103 |
| 7,684,630 B2 * | 3/2010 | Steinberg | ............. | 382/243 |
| 7,847,830 B2 * | 12/2010 | Rogers et al. | ............. | 348/222.1 |
| 7,860,274 B2 * | 12/2010 | Steinberg et al. | ............. | 382/103 |
| 7,912,245 B2 * | 3/2011 | Steinberg et al. | ............. | 382/103 |

* cited by examiner

*Primary Examiner* — Jose Couso
(74) *Attorney, Agent, or Firm* — Thomas, Kayden, Horstemeyer & Risley, LLP (57) ABSTRACT

Flesh-tones corrections may be performed to correct color shifts that may occur in transmitted video frames wherein chroma information corresponding to flesh-tone video pixels may be distorted. A target region may be determined based on a determined flesh-tones region within a spatial representation of chroma in video color space, such as Y'CrCb. The flesh-tones correction may utilize one or more methodologies based on an elliptical shape and/or a triangular shape algorithm(s). A video processing system may be utilized to analyze chroma information of received video pixels and/or to perform flesh-tones corrections by shifting the chroma value of received video pixels towards good flesh-tones regions to compensate for possible distortions. The video processing system may perform conversion calculation and/or shift operations dynamically. The video processing system may also utilize lookup tables (LUTs) to convert received chroma values. The LUTs may be programmable to enable modifying and/or updating of the system.

30 Claims, 7 Drawing Sheets

METHOD AND SYSTEM FOR AUTOMATIC CORRECTION OF FLESH-TONES (SKIN-TONES)

CROSS-REFERENCE TO RELATED APPLICATIONS/INCORPORATION BY REFERENCE

[Not Applicable].

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to video processing. More specifically, certain embodiments of the invention relate to a method and system for automatic correction of flesh-tones (skin-tones).

BACKGROUND OF THE INVENTION

In video systems, an image is projected in a display terminal such as televisions and/or PC monitors. Most video broadcasts, nowadays, utilize video processing applications that enable broadcasting video images in the form of bit streams that comprise information regarding characteristics of the image to be displayed including brightness (luma) and color (chroma). These video applications may utilize one or more of available encoding scheme including Y'CbCr, wherein the chroma data in each video pixel may be represented via the Cb-Cr value.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for automatic correction of flesh-tones (skin-tones), substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for automatic correction of flesh-tones (skin-tones). Color shifts may occur in transmitted video frames wherein chroma information corresponding to video pixels carrying flesh tones may be distorted. To perform flesh-tones corrections, a target region, for correction, may be determined based on a determined good flesh-tones region within a representation of chroma in a video encoding scheme. The flesh-tones correction may be achieved based on a methodology that utilizes an elliptical shape in a color space and/or on a methodology that utilizes a triangular shape in a color space. Flesh-tones correction may be performed via a video processing system, which may utilize a flesh-tones corrections processing subsystem. Input frames may initially be encoded in a Y'CrCb color space. Consequently, the video processing system may perform analysis of the Cb-Cr information of received video pixels to determine the need for flesh-tones corrections. Compensation of distortion may be achieved by shifting the Cb-Cr value of specific regions of the received video pixels towards good flesh-tones regions. The video processing system may dynamically perform necessary conversion calculation and/or shift operations. Alternatively, the video processing system may utilize lookup tables (LUTs) to convert received Cb-Cr values to corrected values. The LUTs may be programmable so as to enable modifying and/or updating the video processing system.

Figure 1A:
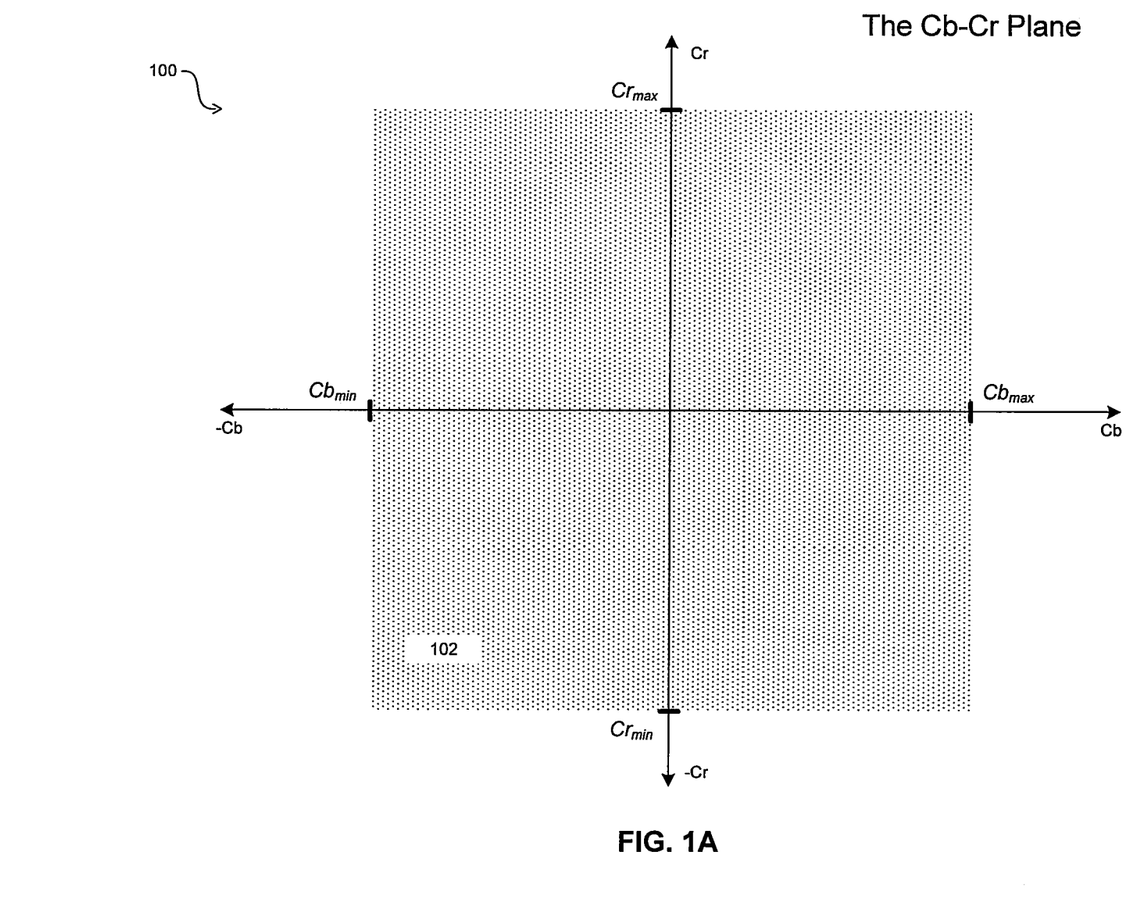
FIG. 1A is a diagram that illustrates a Cb-Cr plane for chroma values of video pixels, which may be utilized in accordance with an embodiment of the invention.

FIG. 1A is a diagram that illustrates a Cb-Cr plane for chroma values of video pixels, which may be utilized in accordance with an embodiment of the invention. Referring to FIG. 1A, there is shown a Cb-Cr plane 100, a 2-dimensional plane representing color information based on Y'CbCr video scheme, which may be utilized in video encoding systems. The shaded region 102 may represent a valid Cb-Cr region in the Cb-Cr plane 100.

Digital image processing systems may utilize Y'CbCr video encoding scheme. In systems that utilize the Y'CbCr color space, the Cr and Cb may correspond to color, or chroma, component of a digital image while Y' may represent the brightness, or luma, component of a digital image. In Y'CbCr color space systems may represents color as brightness and two color difference signals wherein Y' is the brightness, Cb is blue minus luma (B−Y) and Cr is red minus luma (R−Y). The Y'CbCr encoded video pixels may be represented as triplets (Y', Cr, Cb). In a system that utilizes n-bit encoding, the Y' may vary in value from 0 to $[2^n-1]$, with Y' =0 representing minimum brightness (black), and Y'=$[2^n-1]$ representing maximum brightness (white); the value of Cb may vary between $[-2^{n-1}]$ and $[2^{n-1}]$, with Cb=$[-2^{n-1}]$ representing minimum blue difference, and $Cb=[2^{n-1}-1]$ representing maximum blue-difference; and the value of Cr may vary between $[-2^{n-1}]$ and $[2^{n-1}-1]$, with $Cr=[-2^{n-1}]$ representing minimum red-difference, and $Cr=[2^{n-1}-1]$ representing maximum red-difference. For example, in an 8-bit encoding scheme, an Y'CbCr triplet may be represented as (127, 0, 127), wherein the Y' may have a value of 127, a Cr may have a value of 0, and the Cb may have a value of 127.

The Cb-Cr plane 100 may be utilized to represent available color pixels in a system that utilizes Y'CbCr video scheme. The Cb-axis may represent Cb (blueness) values, and the Cr-axis may represent Cr (redness) values. The shaded region 102 may represent a valid Cb-Cr region in the Cb-Cr plane 100. While the Cb-Cr plane 100, and each of the Cb-axis and/or the Cr-axis may extend indefinitely, only a limited region within the Cb-Cr plane may correspond to valid (Cb, Cr) pairs, which may be based on encoding parameters in the system, wherein a valid Cb value may be between $Cb_{min}$ and $Cb_{max}$, and a valid Cr value may be between $Cr_{min}$ and $Cr_{max}$. For example, in a system that utilizes an 8-bit encoding of Y'CbCr color space, the value of Cb may vary $Cb_{min}=-128$ and $Cb_{max}=127$, and the value of Cr may vary $Cr_{min}=-128$ and $Cr_{max}=127$; and the valid region 102 may be delineated by the pairs (127, 127), (127, −128), (−128, 127), and (−128, −128).

Within the valid region 102, a sub-region may exist that may correspond to flesh-tones (skin-tones), wherein the Cb-Cr pairs in the sub-region may correspond to chroma encoding of video pixel representing a image comprising skin and/or flesh. During video transmissions, for example TV broadcast, encoded data carrying video color information may be subjected to slight shifts. While shifts may generally be tolerable and/or non-noticeable, shifts in chroma information corresponding to flesh-tones may not be acceptable. The human eyes may generally not be sufficiently sensitive to be able to detect shifting of all colors; however, when it comes to human skin even slight shift in the chrominance of the skin may make it look objectionable. For example, if there is a little bit of shift towards yellow hue, it may make the person in the image seem jaundiced, and little shifts towards the red hue may make persons in a video image seem sunburnt. Consequently, a mechanism to correct and/or compensate for potential distortions and/or shifts in skin color information may be necessary.

Figure 1B:
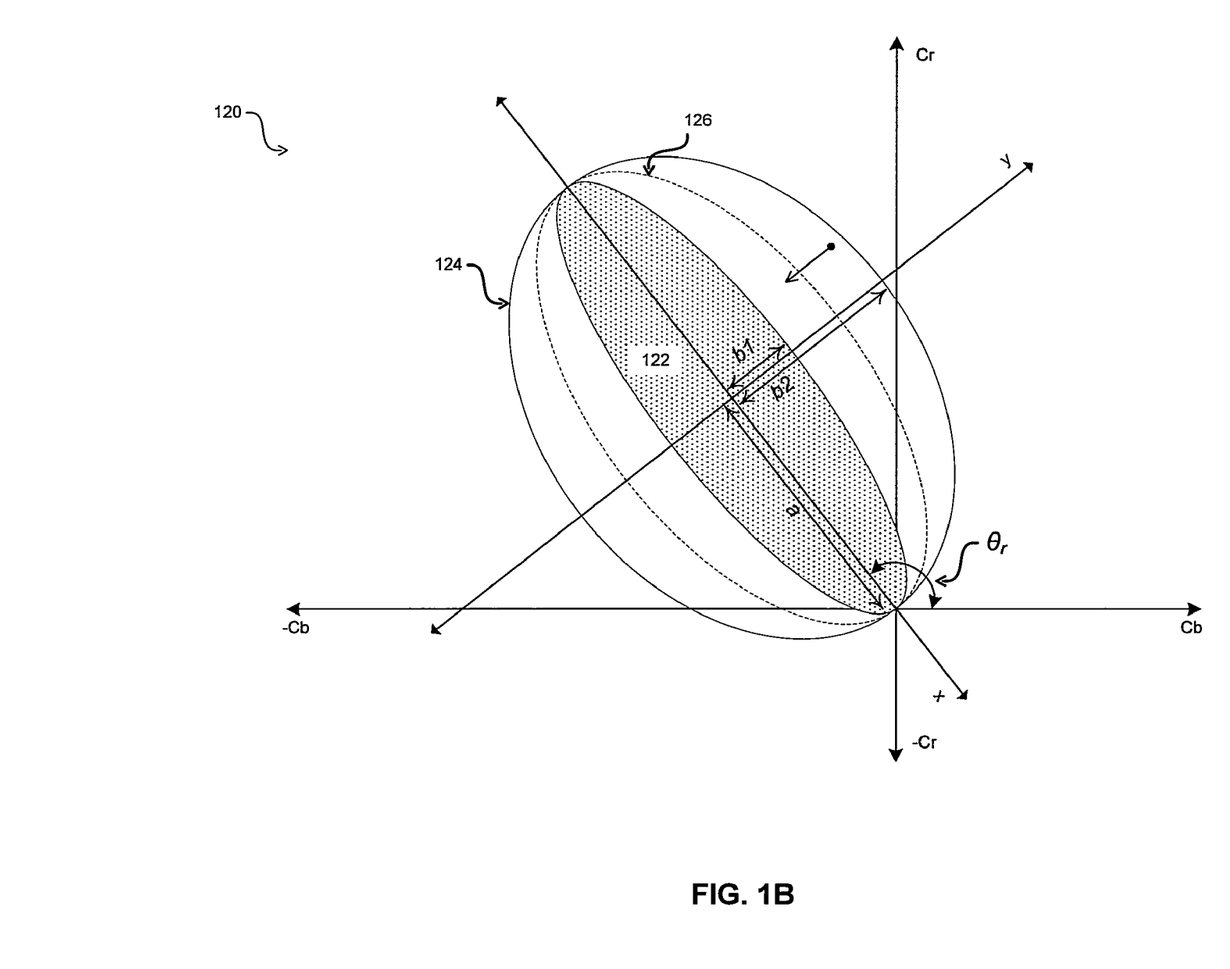
FIG. 1B is a diagram that illustrates an exemplary methodology that utilizes an elliptical shape in a Cb-Cr plane to perform flesh-tones (skin-tone) correction of video pixels, in accordance with an embodiment of the invention.

FIG. 1B is a diagram that illustrates exemplary methodology that utilizes an elliptical shaped algorithm in a Cb-Cr plane to perform flesh-tones (skin-tone) correction of video pixels, which may be utilized in accordance with an embodiment of the invention. Referring to FIG. 1B, there is shown a Cb-Cr plane 120 that is substantially similar to the Cb-Cr plane 100 as described in FIG. 1A.

Within the Cb-Cr plane 120, an elliptical-shaped flesh-tones region 122 may be defined. The specification of the elliptical-shaped flesh-tones region 122 may be determined based on experimental analysis and/or user preference input. For example, the elliptical-shaped flesh-tones region 122 may correspond to an ellipse within a remedial x-y plane, which may be utilized for performing flesh-tones corrections, and with a semi-major axis a, and a semi-minor axis b1. The remedial x-y plane may be rotated at $\theta_r$ in relation to the Cb-Cr plane 120. The specific values assigned to the rotation angle $\theta_r$, the semi-major axis a, and the semi-minor axis b1 may not be fixed, and may be assigned, based on preference and/or experimentation, to comprise as many pixels with chroma corresponding to flesh-tones within an elliptical-shaped region as possible. For example, in a system that utilizes 8-bit Y'CbCr encoding/decoding, $\theta_r$ may be set to 123°, a may be set to 60, and b1 may be set to 15. Additionally, while the x-axis of the remedial x-y plane is shown to pass through the origin of the Cb-Cr plane 120, no such limitation is necessary for the implementation of the invention.

Within the Cb-Cr plane 120, a second elliptical-shaped target region, cocentric with the flesh-tones region 122 within the x-y plane may be defined and delineated by the target ellipse 124. The target ellipse may share the same foci as the elliptical-shaped flesh-tones region 122, and may the same semi-major axis a. The target ellipse 124 may have a different semi-minor axis b2, wherein the semi-minor axis b2 may be greater than the inner semi-minor axis b1. The relative variation between the shift semi-minor axis b2 and the inner semi-minor axis b1 may determined based on based on user preference input regarding degree of desired correction, and/or experimentation data to comprise as many pixels that may be suitable for flesh-tones correction as possible. For example, in the previous system that utilizes 8-bit Y'CbCr encoding/decoding, where b1 may be set to 15, b2 may be set as large as 35, based on user preference input. A medial ellipse 126 may also be defined and/or utilized, wherein the medial ellipse 126 may comprise plurality halfway points between the elliptical-shaped flesh-tones region 122 and the target ellipse 124 along the semi-minor axes b1 and b2.

In operation, the target ellipse 124 may delineate a shift target region. (Cb-Cr) pairs that may be situated within the target ellipse 124 but outside the elliptical-shaped flesh-tones region 122 may correspond to video pixels whose chroma may correspond to values that may be suitable for flesh-tones correction shifting. For each (Cb, Cr) pair in the Cb-Cr plane 120, saturation (Sat) and angle (θ) information may be first determined. For example, where the x-axis may pass through the origin point of the Cb-Cr plane 120:

$$Sat = \sqrt{Cb^2 + Cr^2}$$

$$\theta = \tan^{-1}(Cr/Cb)$$

The calculated saturation (Sat) and angle (θ) may enable transforming the (Cb, Cr) pair onto the remedial x-y plane, wherein the location of the (Cb, Cr) pair may handled as an (x, y) pair:

$$x = Sat^* \cos(\theta - \theta_r) - a$$

$$y = Sat^* \sin(\theta - \theta_r).$$

In cases where the (x, y) pair may fall within the elliptical-shaped flesh-tones region 122, for example where |y|<b1 and |x|<a, the corresponding pixel may be deemed to already have acceptable flesh-tone, and no correction and/or shifting may be necessary. In cases where the (x, y) pair may fall outside the target ellipse 124, for example where |y|>b2 and |x|>a, the corresponding pixel may be deemed to have a low probability of representing flesh colors, and no shift may be correction would be necessary. However, in cases where the (x, y) pair may fall in the area between the elliptical-shaped flesh-tones region 122 and the target ellipse 124, a shift may be applied to the (x, y) pair. In applying the methodology based on the elliptical shape for flesh-tones correction, the shift may be limited in a direction parallel to the semi-minor axes b1 and b2. Consequently, the x-value may not be modified, and any shift may be limited to the y-value by determining an $y_{shift}$ value, wherein $y_{new} = y + y_{shift}$. The $y_{shift}$ may be determined to shift Y-value from the target ellipse 124 and/or towards the elliptical-shaped flesh-tones region 122. Generally, the closer the y-value is to the medial ellipse 126, the greater the $y_{shift}$. Additionally, user preference input and/or experimental data may be utilized in determining $y_{shift}$.

Once the new location, (x, y$_{new}$), is determined within the remedial x-y plane, the new location may be transformed onto the Cb-Cr plane 120, for example a new (Cb$_{new}$, Cr$_{new}$) pair.

In an alternative embodiment of the invention, the methodology that utilizes an elliptical shaped algorithm may also be implemented wherein the calculated saturation (Sat) of the original (Cb, Cr) value may be maintained. Consequently, the shift of the original (x, y) pair may not be limited in a direction parallel to the semi-minor axes b1 and b2; and both the x and the y values may be modified such that the new (Cb$_{new}$, Cr$_{new}$) value, which may correspond to shifting the original (Cb, Cr) value toward the elliptical-shaped flesh-tones region 122, may yield a saturation value Sat$_{new}$, based on the values of Cb$_{new}$ and Cr$_{new}$, that may be equal to the original saturation value Sat.

Figure 1C:
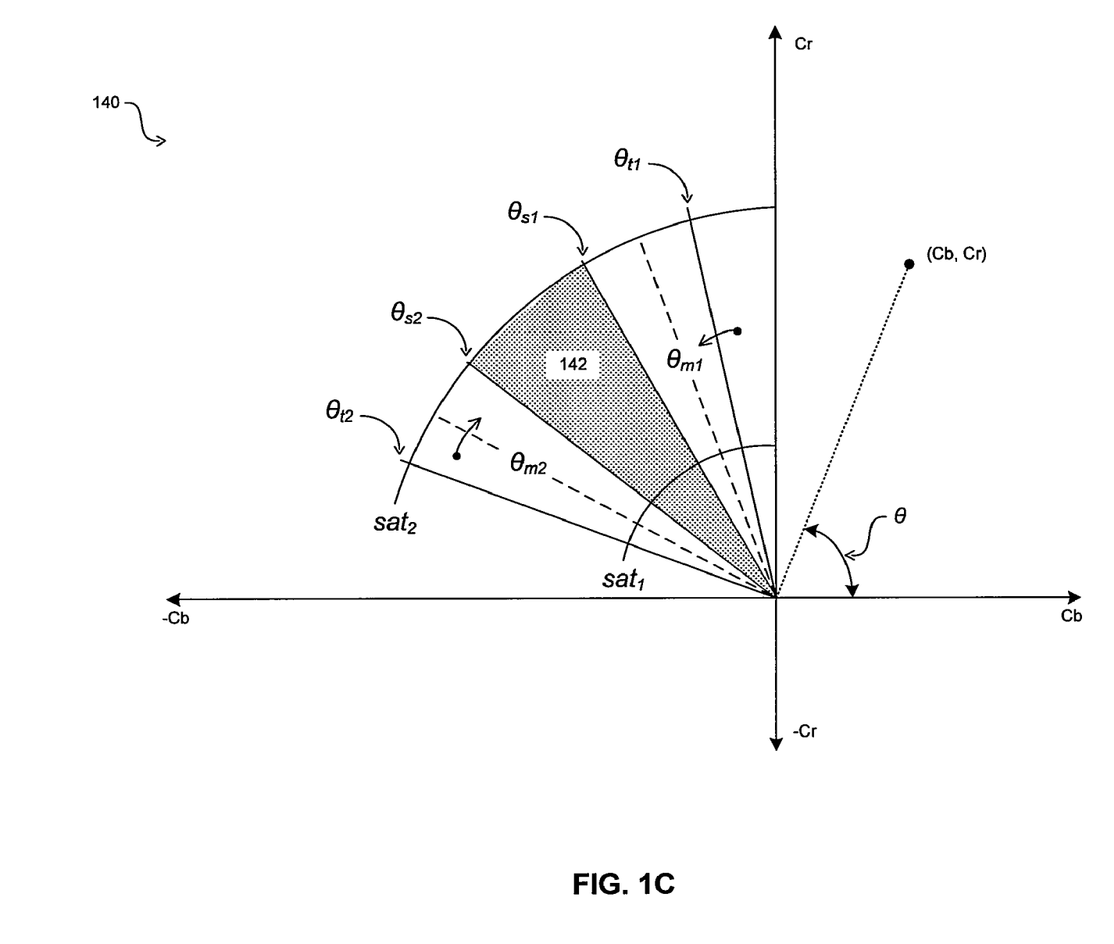
FIG. 1C is a diagram that illustrates an exemplary methodology that utilizes a triangular shaped algorithm in a Cb-Cr plane to perform flesh-tones (skin-tone) correction of video pixels, in accordance with an embodiment of the invention.

FIG. 1C is a diagram that illustrates an exemplary methodology that utilizes a triangular shaped algorithm in a Cb-Cr plane to perform flesh-tones (skin-tone) correction of video pixels, which may be utilized in accordance with an embodiment of the invention. Referring to FIG. 1C, there is shown a Cb-Cr plane 140 that is substantially similar to the Cb-Cr plane 100 as described in FIG. 1A.

Within the Cb-Cr plane 140 a triangular-shaped flesh-tones region 142 may be defined, and may comprise (Cb, Cr) pairs corresponding to flesh-tones. The specification of the triangular-shaped flesh-tones region 142 may be determined based on experimental analysis and/or user preference input. For example, the triangular-shaped flesh-tones region 142 may be delineated via two angles $\theta_{s1}$ and $\theta_{s2}$. The specific values assigned to the angles $\theta_{s1}$ and $\theta_{s2}$ may not be fixed, and may be assigned, based on preference and/or experimentation, to comprise as many pixels with chroma corresponding to flesh-tones within triangular-shaped flesh-tones region 142. For example, in a system that utilizes 8-bit Y'CbCr encoding/decoding, the angles $\theta_{s1}$ and $\theta_{s2}$ may be set to 120° and 130°, respectively. Also, within the Cb-Cr plane 140, target regions outside of the triangular-shaped flesh-tones region 142 may be defined, and may be delineated by the angles $\theta_{t1}$ and $\theta_{t2}$. The specific values assigned to the angles $\theta_{t1}$, and $\theta_{t2}$ may be determined based on user preference input regarding degree of desired correction, and/or experimentation data to comprise as many pixels that may be suitable for flesh-tones correction as possible. For example, in the previous system where the angles $\theta_{s1}$ and $\theta_{s2}$ may be set to 120° and 130°, respectively, the angles $\theta_{t1}$ and $\theta_{t2}$ may be set as far as 80° and 170°, respectively. In addition, medial angles $\theta_{m1}$ and $\theta_{m2}$ may be defined and/or utilized to delineate halfway points between the angles $\theta_{s1}$ and $\theta_{t1}$, and between the angles $\theta_{s2}$ and $\theta_{t2}$, respectively.

In operation, the angles $\theta_{t1}$ and $\theta_{t2}$ may delineate a shift target region. (Cb-Cr) pairs that may be situated within the shift target region but outside the triangular-shaped flesh-tones region 142 may correspond to video pixels whose chroma may correspond to values that may be suitable for flesh-tones correction shifting. For each (Cb, Cr) pair in the Cb-Cr plane 140, saturation (Sat) and angle (θ) information may be first determined:

$$Sat = \sqrt{Cb^2 + Cr^2}$$

$$\theta = \tan^{-1}(Cr/Cb)$$

In cases where the angle θ may be between the angles $\theta_{s1}$ and $\theta_{s2}$, the corresponding pixel may be deemed to already have acceptable flesh-tone, and no correction and/or shifting may be necessary. In cases where the angle θ may be less then the angle $\theta_{t1}$, or greater than the angle $\theta_{t2}$, the corresponding pixel may be deemed to have a low probability of representing flesh colors, and no shift may be correction would be necessary. Otherwise, a shift may be applied to the (Cb, Cr) pair to perform flesh-tones correction. In applying the methodology based on the triangular shape for flesh-tones correction, the calculated saturation (Sat) may be maintained unchanged, and the pixel may be subject only to angular shifting of its angle θ. Consequently, a new angle $\theta_{new}$, may be determined, wherein $\theta_{new} = \theta + \theta_{shift}$. The $\theta_{shift}$ may be determined to enable shifting the angle θ in a direction away from the angles $\theta_{t1}$ and/or $\theta_{t2}$, and/or towards the triangular-shaped flesh-tones region 142. Generally, the closer the angle θ to the medial angles $\theta_{m1}$ and/or $\theta_{m2}$, the greater the $\theta_{shift}$. Additionally, user preference input and/or experimental data may be utilized in determining $\theta_{shift}$. Additionally, there may be instances when original saturation may not be modified when the methodology based on the triangular shape is utilized, and certain determined or predetermined saturations values may be utilized. For example, Sat$_2$ may be utilized as a limit, wherein pixels with Sat>Sat$_2$ may not be subjected to any shifts, regardless of the value of the angle θ. Similarly, Sat$_1$ may be utilized to smooth shifting by applying varying factors of shift on suitable pixels, wherein pixels with Sat>Sat$_1$ may be subjected to greater shift than pixels with Sat<Sat$_1$. The values of Sat$_1$ and/or Sat$_2$ may be based on user preference input and/or experimental data for example.

Once the new angle $\theta_{new}$ has been determined, a new (Cb$_{new}$, Cr$_{new}$) pair for the target pixel may be determined based on the new angle $\theta_{new}$ and the original saturation (Sat). Till here.

Figure 2:
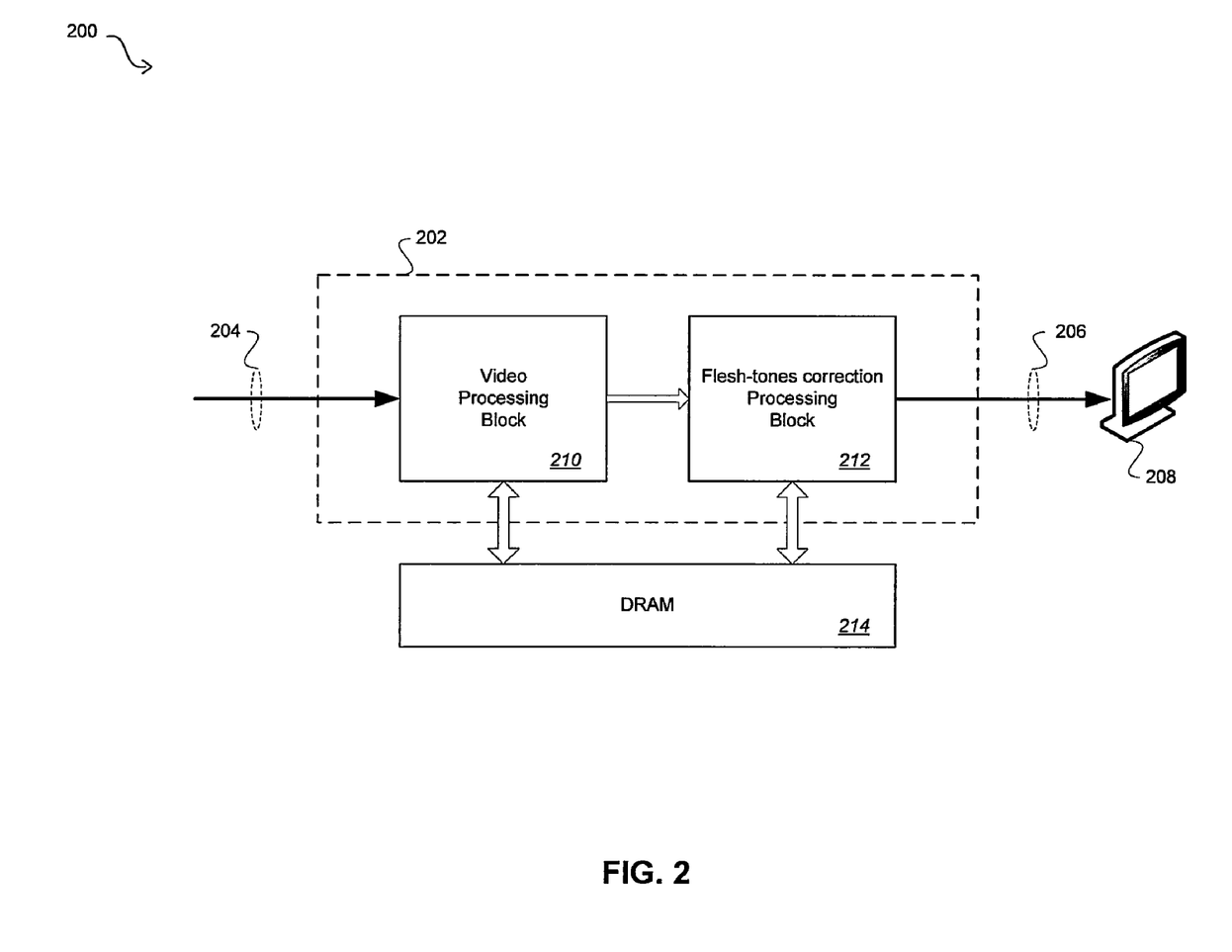
FIG. 2 is a block diagram illustrating an exemplary system that may enable flesh-tones correction, in accordance with an embodiment of the invention.

FIG. 2 is a block diagram illustrating an exemplary system that may enable flesh-tones correction, which may be utilized in accordance with an embodiment of the invention. Referring to FIG. 2, there is shown a video processor 202, an input video stream 204, an output video stream 206, a video display 208, a video processing block 210, a flesh-tones correction processing block 212, and a Dynamic Random Access Memory (DRAM) 214.

The input video stream 204 may comprise a sequence of original frames or fields that may be processed via the video processor 202 for display via the video display 208 after getting. The output video stream 206 may comprise a stream of processed frames or fields that may be displayed via the video display 208. The video display 208 may comprise suitable logic, circuitry and/or code that may enable displaying a steam of video frames, for example the output video stream 206. The invention may not be limited to a specific type of displays, and may comprise, for example, an LCD or plasma display.

The video processor 202 may comprise the flesh-tones correction processing block 212, the video processing block 210, and suitable logic, circuitry and/or code that may enable video processing. The invention may not be limited to a specific processor, but may comprise for example, a general purpose processor, a specialized processor or any combination of suitable hardware, firmware, software and/or code, which may be enabled to provide video processing and/or flesh-tones correction in accordance with the various embodiments of the invention.

The video processing block 210 may comprise suitable logic, circuitry and/or code that may enable performing various processing operations that may be necessary during video processing. For example, the video processing block 210 may enable performing video operations such as scaling, deinterlacing, sharpening, and/or noise reduction. The flesh-tones correction processing block 212 may comprise suitable logic, circuitry and/or code that may enable performing flesh-tones correction operations during video processing.

The DRAM 214 may comprise suitable logic, circuitry and/or code that may enable non-permanent storage and fetch of data and/or code used by the video processor 202 during video processing and/or motion flesh-tones correction operations. While FIG. 2 may illustrate the DRAM 214 situated external to the video processor 202, the invention may not be so limited. Accordingly, the DRAM 214 may be integrated internal within the video processor 202. Additionally, while FIG. 2 may illustrate the DRAM 214 used in conjunction with the video processor 202, other types of memory may be utilized instead.

In operation, the input video stream 204 may be received by the video processor system 202. The video processing system 202 may perform video processing of the input video stream 204, and the flesh-tones correction processing block 212, and/or the video processing block 210 may be utilized to perform said video processing. The DRAM 214 may be utilized for storing and/or fetching data utilized during processing of input video stream 204. The video processing block 210 may be utilized during video processing of input video stream 204 in the video processing system 202, and may enable performing such operations as scaling, deinterlacing, sharpening, and/or noise reduction. While performing these operations in the video processing block 210, data may be stored into, and fetched from the DRAM 214. The flesh-tones correction processing block 212 may enable performing flesh-tones correction operations on the input video stream 204. The flesh-tones correction processing block 212 may enable generation of flesh-tones corrected pixels corresponding to distorted received pixels, utilizing the methodology based on the elliptical shape, and/or the methodology based on the triangular shape, for example, substantially as described in FIG. 1B and FIG. 1C, respectively. The output video stream 206, comprising flesh-tones corrected pixels, may then be forwarded from the video processing system 202 to the video display 208. While the flesh-tones correction processing block 212 may be shown to perform flesh-tones corrections at the end of video processing operations within the video processor 202; no such limitation is necessary to implement the invention. Instead, the flesh-tones correction processing block 212 may be utilized at the beginning, and/or in the middle of video processing operations within the video processor 202 in alternate implementations of the video processor 202 in other embodiments of the invention.

In an embodiment of the invention, the flesh-tones correction values that may be assigned to pixels in the output video stream 206 may be determined, and pre-programmed into look-up tables (LUTs). Accordingly, flesh-tones correction processing block 212 may comprise such LUTs wherein flesh-tones corrections may be performed by simply "looking-up" new Cb-Cr values that may be assigned to output pixels based on chrominance values input pixels.

Figure 3A:
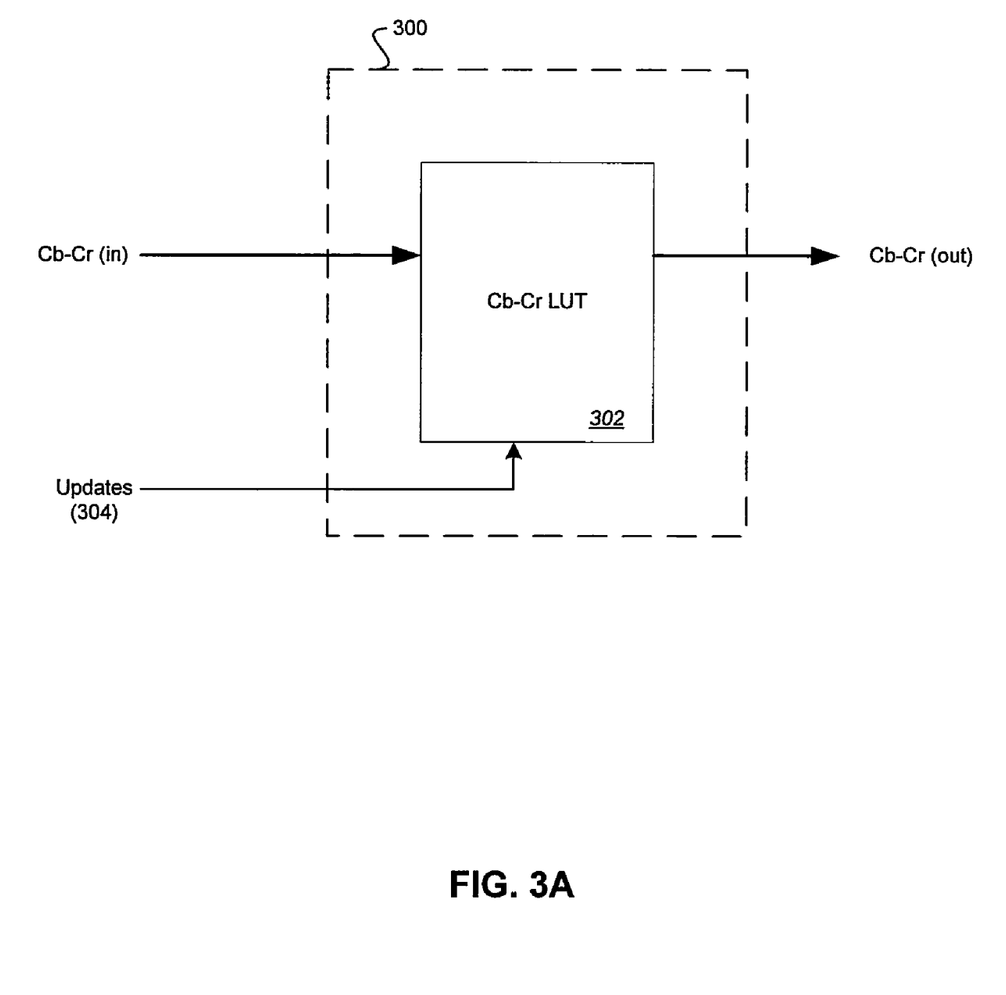
FIG. 3A is a block diagram illustrating an exemplary system that utilizes lookup-up tables (LUTs) to perform Cb-Cr conversion, in accordance with an embodiment of the invention.

FIG. 3A is a block diagram illustrating an exemplary system that utilizes lookup-up tables (LUTs) to perform Cb-Cr conversion, in accordance with an embodiment of the invention. Referring to FIG. 3A, there is shown a LUTs block 300, a Cb-Cr LUTs 302, and an updates input 304.

The LUTs block 300 may comprise the Cb-Cr LUTs 302 and suitable logic, circuitry and/or code that may enable performing look-up operations to facilitated flesh-tones corrections. Additionally, the LUTs block 300 may also comprise suitable logic, circuitry and/or code that may enable reprogrammability of the Cb-Cr LUTs 302, via the updates input 304, for example. The LUTs block 300 may be integrated, for example, within the flesh-tones correction processing block 212 in the video processing system 202, substantially as described in FIG. 2.

The Cb-Cr LUTs 302 may enable performing look-up operations to facilitated conversion of Cb-Cr values in a video processing system. For example, the Cb-Cr LUTs 302 may utilize a 2-dimensional array structure to enable storage and/or fetching of Cb-Cr(out) values based on inputted Cb-Cr(in) values. Additionally, the Cb-Cr LUTs 302 may be reprogrammable, wherein Cb-Cr(out) values may be stored, modified, and/or updated into the Cb-Cr LUTs 302 based on received updates input 304.

In operation, the Cb-Cr LUTs 302 may enable performing Cb-Cr conversions, during flesh-tones corrections for example, wherein Cb-Cr(in) values may be converted to Cb-Cr(out) values. The Cb-Cr LUTs 302 may enable conversion of valid Cb-Cr values, for example Cr values that are between $Cr_{min}$ and $Cr_{max}$ and/or Cb values that are between $Cb_{min}$ and $Cb_{max}$ in a system that may implement the Cb-Cr plane 100, substantially as described in FIG. 1A. For each valid Cb-Cr value of Cb-Cr (in), the Cb-Cr LUTs 302 may be enabled to look up a corresponding Cb-Cr(out) value, wherein the value of Cb-Cr(in) may be utilized as an index to lookup a corresponding value in a 2-dimensional array, for example. The Cb-Cr LUTs 302 may be programmed, via the updates input 304 for example, to store Cb-Cr(out) values that may reflect a specific conversion requirement. For example, the Cb-Cr LUTs 302 may be programmed such that the Cb-Cr(out) values stored and utilized may correspond to use of the methodology based on the elliptical shape for flesh-tones correction, substantially as described in FIG. 1B. Additionally, the Cb-Cr LUTs 302 may be reprogrammed, for example to modify the stored Cb-Cr(out) values due to use of different user preference input, new experimental data, and/or use of a different methodology such as the methodology based on the triangular shape. Finally, the Cb-Cr LUTs 302 may be programmed to enable passing the Cb-Cr(in) values unchanged, wherein the values of Cb-Cr(out) may be set to be the same as the values of Cb-Cr(in).

While the Cb-Cr (in) and/or Cb-Cr (out) may be shown in FIG. 3A as single lines, each may be implemented as an n-bit connector in a system implementation. For example, in a system that utilizes 8-bit encoding, the Cb-Cr(in) may be 8-bit inputs, and the Cb-Cr(out) may be 8-bit outputs.

Figure 3B:
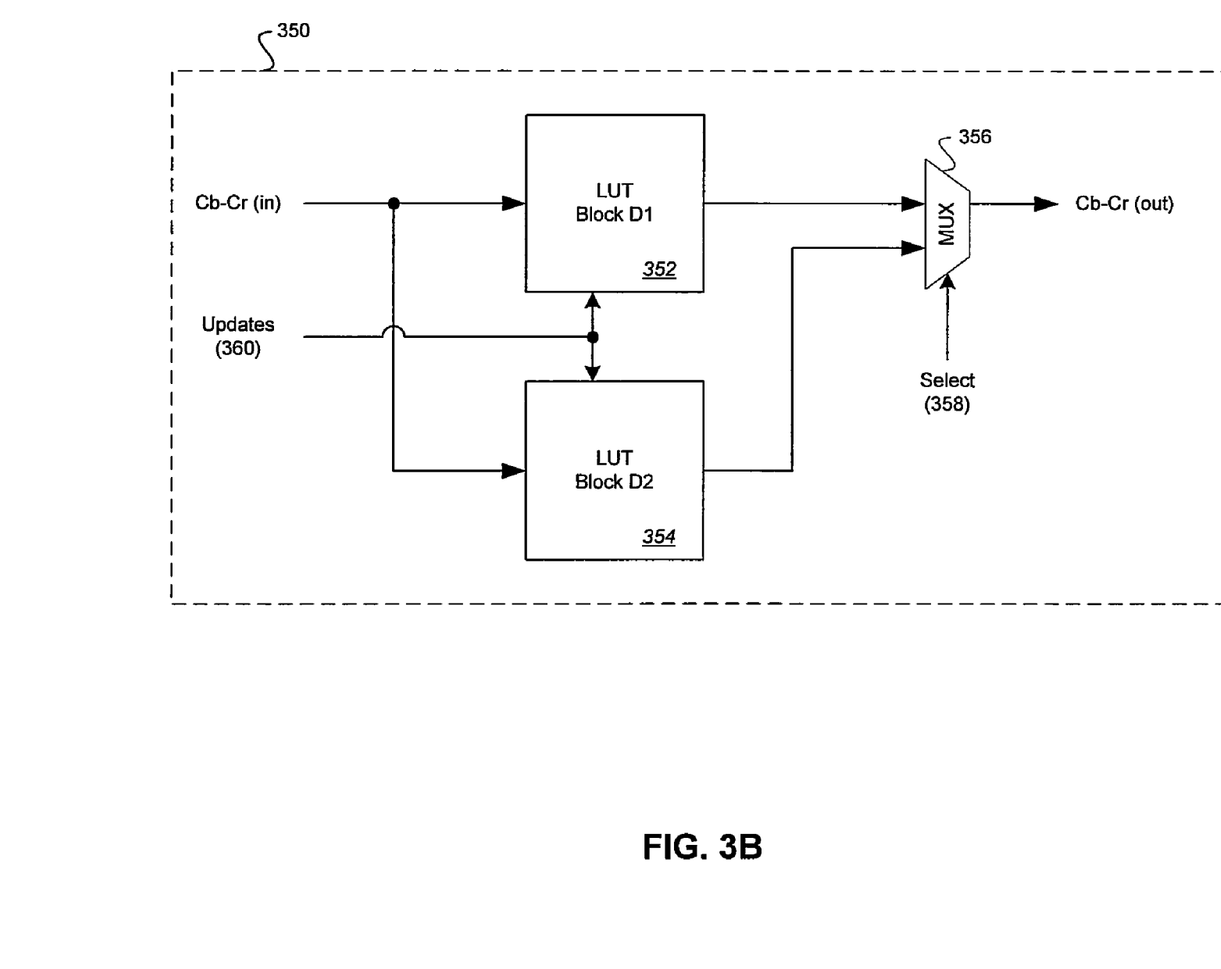
FIG. 3B is a block diagram illustrating exemplary dual lookup-up tables (LUTs) blocks that enable reprogrammability and selectivity when performing Cb-Cr conversion, in accordance with an embodiment of the invention.

FIG. 3B is a block diagram illustrating an exemplary dual lookup-up tables (LUTs) blocks that enable reprogrammability and selectivity when performing Cb-Cr conversion, in accordance with an embodiment of the invention. Referring to FIG. 3B, there is shown a dual-LUTs system 350, a LUTs block D1 352, a LUTs block D2 354, an output multiplexer (MUX) 356, a select signal 358, and an updates input 360.

The dual-LUTs system 350 may comprise the LUTs block D1 352, the LUTs block D2 354, the MUX 356, and suitable logic, circuitry and/or code that may enable utilizing look-up operations to perform video processing operations, which may comprise flesh-tones corrections. The LUTs block D1 352 and the LUTs block D2 354 may each be comprised substantially similar to the LUTs block 300. The MUX 356 may enable selection of an output from a plurality of inputs based on control signal "Select" input 358. The "updates" input 360 may comprise information, data, and/or code that maybe enable reprogramming the LUTs block D1 352 and/or the LUTs block D2 354.

In operation, the dual-LUTs system 350 may enable video processing operation that may comprise utilizing flesh-tones corrections. The MUX 356 may enable selecting between the outputs of the LUTs block D1 352 and the LUTs block D2 354 based on the "select" input 358. The LUTs block D1 352 and the LUTs block D2 354 may enable performing various video conversions based on stored information and/or data.

For example, the LUTs block D1 352 may be programmed to enable performing flesh-tones corrections substantially as described in FIG. 3A, while the LUTs block D2 354 may be programmed to pass forward the chroma information (Cb-Cr) of received video pixels unaltered. Accordingly, the LUTs block D1 352 and the LUTs block D2 354 may enable demonstration of the improvement that may occur because of the invention wherein pixels in a part the display 208 may be fed from the LUTs block D1 352, and pixels in the remaining part of the display 208 may be fed from the LUTs block D2 354.

Other operations may be enabled utilizing the dual-LUTs system 350. For example, the dual-LUTs system 350 may be integrated within the flesh-tones correction processing block 212 in the video processing system 202 to enable seamless updates in the system, wherein the LUTs block D1 352 and the LUTs block D2 354 may enable updating new Cb-Cr conversion information during use of the dual-LUTs system 350. The "select" input 358 may enable utilizing the LUTs block D1 352, which may comprise current Cb-Cr conversion information, while LUTs block D2 354 may be updated with new Cb-Cr conversion information via the "updates" input 360. Subsequently, the dual-LUTs system 350 may switch to using the new Cb-Cr information by selecting the output of LUTs block D2 354 via MUX 356 while the LUTs block D1 352 may also be updated with the new Cb-Cr information.

Figure 4:
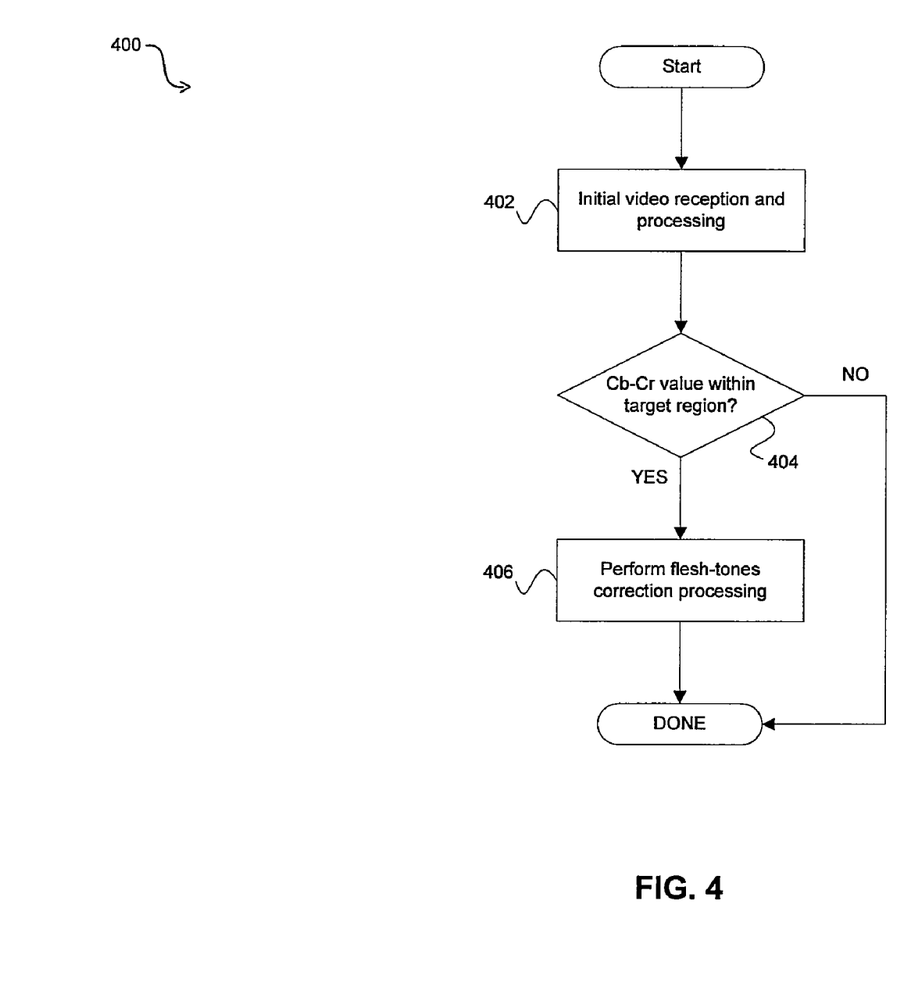
FIG. 4 is an exemplary flow diagram for flesh-tones correction in a system that shifts target Cb-Cr pairs, in accordance with an embodiment of the invention.

FIG. 4 is an exemplary flow diagram for flesh-tones correction in a system that shifts target Cb-Cr pairs, in accordance with an embodiment of the invention. Referring to FIG. 4, there is shown a flow chart 400 comprising a plurality of exemplary steps, which may enable flesh-tones correction in a video processing system.

In step 402, video pixels may be received in a video processing system. For example, the input video stream 204, which may comprise data corresponding to video pixels that may be encoded via a video encoding scheme like Y'CbCr color space may be received in the video processing system 202. The received video data may be processed initially, in the video processing system 202 for example, to extract the chroma information corresponding to the video pixels in the stream. For example, the Cb-Cr information may be extracted for video pixels data transmitted via the input video stream 204. In step 404, a determination may be made as to whether the extracted Cb-Cr information may require flesh-tones corrections may be performed. For example, in a system that may utilize the methodology based on the elliptical shape, substantially as described in FIG. 1B, a determination may be made as to whether the Cb-Cr value of received video pixel falls within the target ellipse 124 and outside elliptical-shaped flesh-tones region 122 may be performed. In instances where the Cb-Cr value of the received video pixel may indicate that the corresponding pixel may already have acceptable flesh-tone, and/or to indicate that no correction and/or shifting may be necessary, the exemplary steps may terminate.

Returning to step 404, in instances where the Cb-Cr value of the received video pixel may indicate that flesh-tones corrections and/or shifting may be necessary, the exemplary steps may proceed to step 406. In step 406, flesh-tones corrections may be performed on received video pixels. For example, the flesh-tones correction processing block 212 may enable utilizing the video processing system 202 to perform necessary flesh-tones corrections on received video pixels, substantially as described in FIG. 2. The flesh-tones corrections may be achieved utilizing the methodology based on the elliptical shape, as described in FIG. 1B, and/or the methodology based on the triangular shape, as described 1C. Lookup tables (LUTs) comprising pre-programmed value mappings may be utilized for fast and/or efficient conversions, for example the LUTs block 300, substantially as described in FIG. 3A.

Various embodiments of the invention may comprise a method and system for automatic correction of flesh-tones (skin-tones). Color shifts may occur in transmitted video frames wherein chroma information corresponding to video pixels carrying flesh tones may be distorted. To perform flesh-tones corrections, a target region, for correction, may be determined based on a determined good flesh-tones region within a representation of chroma in video encoding scheme. The flesh-tones correction may be achieved via the methodology based on elliptical shape and/or the methodology based on the triangular shape. The flesh-tones correction may be performed via the video processing system 202, wherein the flesh-tones corrections processing block 210 may be utilized to perform correction operations. The input frame may initially be Y'CrCb encoded or formatted. Consequently, the video processing system 202 may perform analysis of the Cb-Cr information of received video pixels to determine the need for flesh-tones corrections. The flesh-tones corrections processing block 210 may compensate for possible distortions by shifting the Cb-Cr value of received video pixels towards good flesh-tones regions. The flesh-tones corrections processing block 210 may be enabled to dynamically perform conversion calculation and/or shift operations. Alternatively, the flesh-tones corrections processing block 210 may utilize the LUTs block 300 to convert received Cb-Cr values to corrected values. The LUTs block 300 may be programmable to enable modifying and/or updating the video processing system 202.

Another embodiment of the invention may provide a machine-readable storage, having stored thereon, a computer program having at least one code section executable by a machine, thereby causing the machine to perform the steps as described herein for automatic correction of flesh-tones (skin-tones).

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for video processing, the method comprising:
   in a video processing device:
   determining a flesh-tones region within a spatial representation of chrominance information, wherein pixels corresponding to said flesh-tones region comprise flesh coloring;
   determining a target region, outside of said flesh-tones region, for pixel shifting to correct transmission errors; and
   shifting pixels, located within said target region, towards said flesh-tones region.

2. The method according to claim 1, wherein said pixel shifting, of pixels corresponding to said target region towards said flesh-tones region, enables smooth transition from said flesh-tones region.

3. The method according to claim 1, wherein said chrominance information is based on Y'CbCr color space.

4. The method according to claim 3, wherein said spatial representation comprises a Cartesian plane, with two axes in said Cartesian plane representing Cr and Cb values of pixels within said Y'CbCr color space.

5. The method according to claim 4, wherein said flesh-tones region and said target region are co-centric ellipses within said Cartesian plane.

6. The method according to claim 5, wherein said co-centric flesh-tones and target ellipses are rotated relative to said axes of said Cartesian plane, and/or said co-centric flesh-tones and target ellipses shifted relative to an origin of said Cartesian plane.

7. The method according to claim 5, wherein foci and/or semi-major axes of said co-centric flesh-tones and target ellipses are identical, and a semi-minor axis of said target ellipse is greater than a semi-minor axis of said flesh-tones ellipse.

8. The method according to claim 7, wherein location of said foci, value of said semi-major axis, and/or values of said semi-minor axes of said co-centric flesh-tones and target ellipses are pre-determined.

9. The method according to claim 7, wherein location of said foci, value of said semi-major axis, and/or values of said semi-minor axes of said co-centric flesh-tones and target ellipses are determined and applied dynamically.

10. The method according to claim 7, wherein shifting of pixels inside of said target ellipse and outside of said flesh-tones ellipse is parallel to said semi-minor axes of said co-centric flesh-tones and target ellipses.

11. The method according to claim 7, wherein shifting of pixels inside of said target ellipse and outside of said flesh-tones ellipse maintains saturation of said pixels.

12. The method according to claim 1, comprising storing values representing pixels corresponding to said flesh-tones region and/or target regions in one or more look-up-tables (LUTs).

13. The method according to claim 12, comprising shifting of pixels in said target region via said one or more look-up-tables (LUTs).

14. The method according to claim 12, wherein said one or more look-up-tables (LUTs) are programmable.

15. The method according to claim 12, wherein said one or more look-up-tables (LUTs) comprise 2-dimensional arrays that enable storing of Cb-Cr values corresponding to said pixels.

16. A system for video processing, the system comprising:
   one or more processors that enable determination of a flesh-tones region, within a spatial representation of chrominance information, wherein pixels corresponding to said flesh-tones region comprise flesh coloring;
   said one or more processors enable determination of a target region, outside of said flesh-tones region, for pixel shifting to correct transmission errors; and
   said one or more processors enable shifting of pixels, located within said target region, towards said flesh-tones region.

17. The system according to claim 16, wherein said pixel shifting, of pixels corresponding to said target region towards said flesh-tones region, enables smooth transition from said flesh-tones region.

18. The system according to claim 16, wherein said chrominance information is based on Y'CbCr color space.

19. The system according to claim 18, wherein said spatial representation comprises a Cartesian plane, with two axes in said Cartesian plane representing Cr and Cb values of pixels within said Y'CbCr color space.

20. The system according to claim 19, wherein said flesh-tones region and said target region are co-centric ellipses within said Cartesian plane.

21. The system according to claim 20, wherein said co-centric flesh-tones and target ellipses are rotated relative to said axes of said Cartesian plane, and/or said co-centric flesh-tones and target ellipses shifted relative to an origin of said Cartesian plane.

22. The system according to claim 20, wherein foci and/or semi-major axes of said co-centric flesh-tones and target ellipses are identical, and a semi-minor axis of said target ellipse is greater than a semi-minor axis of said flesh-tones ellipse.

23. The system according to claim 22, wherein location of said foci, value of said semi-major axis, and/or values of said semi-minor axes of said co-centric flesh-tones and target ellipses are pre-determined.

24. The system according to claim 22, wherein location of said foci, value of said semi-major axis, and/or values of said semi-minor axes of said co-centric flesh-tones and target ellipses are determined and applied dynamically.

25. The system according to claim 22, wherein said one or more processors enable shifting of pixels inside of side target ellipse and outside of said flesh-tones ellipse parallel to said semi-minor axes of said co-centric flesh-tones and target ellipses.

26. The system according to claim 22, wherein said one or more processors enable shifting of pixels inside of side target ellipse and outside of said flesh-tones ellipse while maintaining saturation of said pixels.

27. The system according to claim 16, wherein said one or more processors enable storage of values representing pixels corresponding to said flesh-tones region and/or target region in one or more look-up-tables (LUTs).

28. The system according to claim 27, wherein said one or more processors enable utilization of said one or more look-up-tables (LUTs) to perform said shifting of pixels in said target region.

29. The system according to claim 27, wherein said one or more look-up-tables (LUTs) are programmable.

30. The system according to claim 27, wherein said one or more look-up-tables (LUTs) comprise 2-dimensional arrays that enable storing of Cb-Cr values corresponding to said pixels.

* * * * *